United States Patent
Farchi et al.

(10) Patent No.: US 9,158,533 B2
(45) Date of Patent: Oct. 13, 2015

(54) MANIPULATING SOURCE CODE PATCHES (75) Inventors: Eitan Daniel Farchi, Pardes Hana (IL); Abel Gordon, Haifa (IL); Nadav Yosef Har'El, Misgav (IL); Moran Shochat, Zichron Ya'akov (IL)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/350,844

(22) Filed: Jan. 16, 2012

(65) Prior Publication Data

US 2013/0185696 A1 Jul. 18, 2013

(51) Int. Cl.
G06F 9/44 (2006.01)
G06F 9/45 (2006.01)
G06F 9/445 (2006.01)

(52) U.S. Cl.
CPC ........................................ G06F 8/71 (2013.01)

(58) Field of Classification Search
CPC ............. G06F 8/70; G06F 8/72; G06F 8/443; G06F 11/3466; G06F 11/3476; G06F 11/3447; G06F 11/3616; G06F 11/3676; G06F 11/3696; G06F 8/71; G06F 8/60; G06F 8/65; G06F 8/67; G06F 8/68; G06F 8/30; G06F 8/437; G06F 21/14; G06F 21/125; G06F 11/1433; G06F 9/45504; G06F 8/73
See application file for complete search history.

(56) References Cited

U.S. PATENT DOCUMENTS

| | | | |
|---|---|---|---|
| 6,594,822 B1 * | 7/2003 | Schweitz et al. | 717/140 |
| 6,698,014 B1 * | 2/2004 | Rechter | 717/137 |
| 7,603,668 B2 * | 10/2009 | Zweifel et al. | 717/174 |
| 7,870,547 B2 * | 1/2011 | Schuft et al. | 717/168 |
| 7,886,272 B1 * | 2/2011 | Episkopos et al. | 717/124 |
| 8,015,220 B1 * | 9/2011 | Volkoff et al. | 707/821 |
| 8,291,384 B2 * | 10/2012 | Takahashi | 717/124 |
| 8,341,600 B2 * | 12/2012 | Sutherland et al. | 717/126 |
| 8,479,161 B2 * | 7/2013 | Weigert | 717/124 |
| 8,561,010 B2 * | 10/2013 | Colgrave et al. | 717/101 |
| 8,627,287 B2 * | 1/2014 | Fanning et al. | 717/124 |
| 8,694,958 B1 * | 4/2014 | Potter et al. | 717/109 |
| 2003/0131313 A1 * | 7/2003 | Flanagan | 715/500 |
| 2003/0163801 A1 * | 8/2003 | Thames et al. | 717/123 |
| 2006/0048130 A1 * | 3/2006 | Napier et al. | 717/168 |
| 2006/0080656 A1 * | 4/2006 | Cain et al. | 717/174 |
| 2006/0101457 A1 * | 5/2006 | Zweifel et al. | 717/174 |
| 2006/0117310 A1 * | 6/2006 | Daniels et al. | 717/168 |
| 2007/0038991 A1 * | 2/2007 | Schuft et al. | 717/172 |

(Continued)

OTHER PUBLICATIONS

Raymond P.L. Buse and Westley R. Weimer. 2008. A metric for software readability. In Proceedings of the 2008 international symposium on Software testing and analysis (ISSTA '08). ACM, New York, NY, USA, 121-130.*

(Continued)

*Primary Examiner* — Don Wong
*Assistant Examiner* — Anibal Rivera
(74) *Attorney, Agent, or Firm* — Ziv Glazer, Adv (57) ABSTRACT

A computerized apparatus, a computer-implemented method and a computer program product for manipulating source code patches. The apparatus comprising a processor that is configured to: obtain a source code patch comprising plurality of source code modification instructions with respect to a source code and to automatically split the source code patch into plurality of sub-patches, wherein applying the plurality of sub-patches on the source code in an order is equivalent to applying the source code patch.

19 Claims, 4 Drawing Sheets

(56) References Cited

U.S. PATENT DOCUMENTS

| | | | |
|---|---|---|---|
| 2007/0220479 A1 | 9/2007 | Hughes | |
| 2007/0261047 A1* | 11/2007 | Sah et al. | 717/168 |
| 2008/0178167 A1* | 7/2008 | Sriram et al. | 717/169 |
| 2008/0216065 A1* | 9/2008 | Oka | 717/168 |
| 2008/0229282 A1* | 9/2008 | deVries et al. | 717/122 |
| 2008/0320457 A1* | 12/2008 | King et al. | 717/146 |
| 2009/0144698 A1* | 6/2009 | Fanning et al. | 717/120 |
| 2009/0210860 A1* | 8/2009 | Sutherland et al. | 717/123 |
| 2009/0249299 A1* | 10/2009 | Farchi et al. | 717/125 |
| 2009/0271768 A1* | 10/2009 | Goodson | 717/125 |
| 2010/0138822 A1* | 6/2010 | Miyazaki | 717/168 |
| 2010/0180258 A1* | 7/2010 | Takahashi | 717/124 |
| 2010/0241469 A1* | 9/2010 | Weigert | 717/123 |
| 2010/0242028 A1* | 9/2010 | Weigert | 717/131 |
| 2011/0066999 A1* | 3/2011 | Rabinovich et al. | 717/104 |
| 2011/0321007 A1* | 12/2011 | Marum et al. | 717/113 |
| 2012/0117549 A1* | 5/2012 | Doyle et al. | 717/147 |

OTHER PUBLICATIONS

Benjamin Close, "Splitting a patch", Clear chain blog post, Nov. 13, 2008.*

Linux Kernel, "How to get your change into the Linux Kernel", Linux documentation 2007.*

Andreas Grunbacher, "How to survive with many patches", SuSe Labs publication, Jun. 12, 2005.*

Wikipedia, the free encyclopedia, "patch (Unix)", Sep. 2011. URL:// http://en.wikipedia.org/wiki/Patch_%28Unix%29.

* cited by examiner

MANIPULATING SOURCE CODE PATCHES

TECHNICAL FIELD

The present disclosure relates generally to computer programming and, more particularly to source code patches.

BACKGROUND

A lot of software development is done using an iterative modify-review process. A developer modifies the source code—e.g., fixes a bug or adds a new feature. However, this modification cannot go into the project immediately—before it can be accepted, the modification needs to be reviewed—by the whole team or by one of more managers of the project.

In certain organizations, face-to-face reviews, where the developer presents his code to the reviewers, are possible. In many other organizations, however, the developers are spread across countries and time zones, or simply find it difficult to coordinate a meeting, and the review is carried out from a distance, such as via email: the developer packages his proposed source-code modification in a patch file and sends this change information to the reviewers. Specifically, this procedure is common in peer-production models, such as open source development.

A "source code patch", or "patch", in the present disclosure is a set of modifications instructions to the source code that are conceptually associated, such as all modifications are aimed to a common goal such as to adding a feature or resolving an existing bug. A patch may be provided as a text file, such as generated using the diff software utility in Unix™ environment, as a revision in a source code control system, such as CVS™, Rational® ClearCase™, or the like.

In many occasions, the patch is accompanied by a human-readable description of the change, to make it easier for the reviewers to understand the patch. The reviewers can accept the proposed changes as-is, or request that certain issues be fixed, after which the developer should send the improved patch for another round of review—until the patch is finally accepted and "committed" into the main source code of the project.

BRIEF SUMMARY

One exemplary embodiment of the disclosed subject matter is a computerized apparatus having a processor, the processor is configured to: obtain a source code patch comprising plurality of source code modification instructions with respect to a source code; automatically split the source code patch into plurality of sub-patches, wherein applying the plurality of sub-patches on the source code in an order is equivalent to applying the source code patch Another exemplary embodiment of the disclosed subject matter is a computer-implemented method performed by a processor, the method comprising: obtaining a source code patch comprising plurality of source code modification instructions with respect to a source code; automatically splitting the source code patch into plurality of sub-patches, wherein the plurality of sub-patches, if applied on the source code in an order, provide an output that is equivalent to applying the source code patch.

Yet another exemplary embodiment of the disclosed subject matter is a computer program product comprising: a non-transitory computer readable medium retaining thereon instructions that, when executed by a processor, are configured to cause the processor to perform the steps of: obtaining a source code patch comprising plurality of source code modification instructions with respect to a source code; and automatically splitting the source code patch into plurality of sub-patches, wherein the plurality of sub-patches, if applied on the source code in an order, provide an output that is equivalent to applying the source code patch.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Seriously reviewing a patch, as opposed to just rubber-stamping it, becomes very difficult as a patch becomes larger than a hundred or so lines (modified, added or deleted). When a patch grows to a thousand lines, the reviewer usually cannot understand the large patch as a whole, nor appreciate the validity of every change within. Moreover, a short description is no longer enough to describe the reasoning behind all of the changes in the patch. Such large patches are common when a large new feature is added to the code.

Generally speaking, it is easier to understand 10 patches, each with 100 lines of functionally-related code and an explanation of what this part of the code does, than to understand one big 1000-line patch which does all sorts of things.

Therefore, projects which insist on a high-quality review process, should insist that large changes be broken up into a series of smaller patches.

Typically, the changes should be split into patches in a way that after applying each patch in the sequence, the code compiles. Moreover, the changes should be split in such a way as to make it easy to explain, and understand, each patch separately. In some exemplary embodiments, the developer may add a separate description to each of the small patches.

However, manually splitting large patches for review is a very time-consuming process.

Therefore it is a technical problem dealt with by the disclosed subject matter to provide an automatic manner of splitting a single patch into plurality of sub-patches. Another technical problem is to merge two or more patches into a single patch. Yet another technical problem is to provide a coherent set of patches based on an initial set of patches, such that a reviewer would be able to effectively review each patch.

One technical solution is to determine a coherency measurement of each patch. The coherency measurement, as is explained hereinbelow, may be affected by a variety of characteristics. Based on the measured coherency, a patch is selected to be split into sub-patches so as to increase a total coherency measurement. Additionally or alternatively, two or more patches are merged into an aggregative patch, so as to increase the total coherency measurement.

In some exemplary embodiments, splitting and/or merging may be performed iteratively until a desired coherency criterion is achieved. In the present disclosure "modifying the split" means modifying a set of patches to create an equivalent modified set of patches by splitting and/or merging patches of the original set.

Another technical solution is to determine an ordering of the patches which, if followed when applying the patches on the source code, each intermediate version does not introduce a new compilation error that was not in the original source code or the original patch or patches. In some exemplary embodiments, the order may be determined based on a dependency between the patches, such that if a first patch is depends on a second patch, then the second patch will be ordered after the first patch.

"Coherency measurement" is a score given for a patch that is useful as a proxy value to indicate how coherent the patch would be to a reviewer, how easy it would be for him to review the patch, and the like. It will be noted that coherency measurement is not related to how well the source code itself is written, the complexity of the implemented algorithm, or a similar feature of the modification. Coherency is affected by many factors. Some exemplary factors are provided hereinbelow.

SIZE OF PATCH: A size of a patch, such as a number of source code lines it addressed (either in deleting, modifying or adding) may affect coherency. There may be a desired optimal patch size which is not too large, on the one hand, and not too small on the other. In some exemplary embodiments, a desired optimal patch size is of about one hundred source code lines. In some exemplary embodiments, the size of patch factor may be taken into account in comparison with the sizes of other patches, such that a desired size distribution is substantially achieved.

PROXIMITY MEASUREMENT: Proximity of the modifications of the patch may affect coherency. As an example, we'd rather that a patch will modify ten continuous lines rather than ten separate lines all over the source code within different files. In some exemplary embodiments, proximity within the same source code file may be measured in distance between lines. In some exemplary embodiments, lines in the same file are closer than lines in different files, files in different directories may be deemed farther than files in the same directory, and so on.

TEXTUAL SIMILARITY: Textual similarity of the modifications may affect coherency. As an example, consider a modification in which all copyright statements in the source code were modified. Reviewing all these modifications together would ease the reviewer and thus may be considered to be more coherent. In some exemplary embodiments, textual similarity between two modifications is caused due to similar comments in the source code, which would suggest that the two are related in function as well and thus may be preferably reviewed together.

DEPENDENCIES: dependencies between modifications may affect coherency. In general, it may be desirable that several dependent pieces of code appear in the same patch. As an example, consider a patch that adds a certain variable. It may be desirable that the same patch would also include the new code that uses it. As another example, consider a patch that induces a new method which calls another newly introduced method, then it may be preferable that both newly introduced methods would be introduced in the same patch.

SHARED DEPENDENCIES: shared dependencies between patches may affect coherency. It may be desirable that several pieces of code that have similar dependencies appear in the same patch, as they are probably associated with a similar reason of being introduced. For example, it may be preferred that two pieces of new or modified code which use the same preexisting variables or functions appear in the same patch.

In some exemplary embodiments, one or more of the above-mentioned parameters (e.g., patch, size, proximity, text similarly, dependency and shared dependencies) or similar parameters may be used to compute a coherency measurement. In some exemplary embodiments, the different factors may be weighted together to compute the coherency measurement.

In some exemplary embodiments, the different factors are taken into account concurrently, with varying weights. As this is the case, the maximal coherency measurement may be achieved even though none of the factors is fully satisfied. For example, a new variable and all the code that uses it might be 1000 lines, and in such a case it will make sense to lose a bit of coherency score on the dependencies factors in order to gain additional score due to the proximity factor, on the desired size, and so on.

In some exemplary embodiments, the split may be modified while ensuring that no circular dependencies are introduced. Two patches are said to be circularly dependent on each other if a first patch is dependent (either directly or indirectly via one or more intermediate patches) on a second patch and vice versa. As an example, consider a first patch defining a function named "foo" and using a function named "bar", while a second patch defining the "bar" function and using the "foo" function. The first patch would introduce a compilation error if applied before the second patch is applied, and vice versa. The circular dependency may be avoided if the two patches are merged or split in a different manner (e.g., definitions in a first patch and usage thereof in a second patch).

It will be noted that Applicants are filing concurrently a U.S. patent application entitled "SOURCE CODE PATCHES", which is hereby incorporated by reference in its entirety. That application discloses a scheme of annotating a source code to indicate plurality of patches. The disclosed subject matter may be applied so as to generate annotations accordingly. For example, the initial split may be provided automatically based on the disclosed subject matter, and manually edited such as disclosed in the Source Code Patches application.

One technical effect is creating patches that are relatively easier for a human reviewer to review. The patches may contain code that addresses the same feature or bug fix, consecutive lines of code, and the like. Therefore, it may make sense to explain what each patch does. In some exemplary embodiments, patches do not comprise unrelated modification that should be explained separately. Additionally or alternatively, each modification that is part of the explanation of a patch is contained by the patch.

Another technical effect of the disclosed subject matter is creating a split in which the sizes of the patches are statistically distributed around a predetermined size. In some exemplary embodiments, the split may balance between having too large of patches and between having too many small patches.

Based on manually-created good splits it can be appreciated that it is not desired that all patches must have the same length, e.g., be exactly 100 lines long. In practice, some patches are short (e.g., when a few changed lines were determined to be completely unrelated to anything else), and some are long (e.g., when a long piece of code is added which doesn't make sense to split). For example, in one example are 2801 modified lines, which are split into 29 patches, on average 97 lines modified per patch. However, 6 of those patches have less than 20 lines, and 6 of them have more than 200 lines. The distribution of patch length is close to an exponential distribution.

Yet another technical effect is avoiding introducing compilation errors by applying the patches in accordance with the determined order. In some exemplary embodiments, a patch does not contain code that relies on a symbol that is only defined in another patch that is ordered after it.

Figure 1:
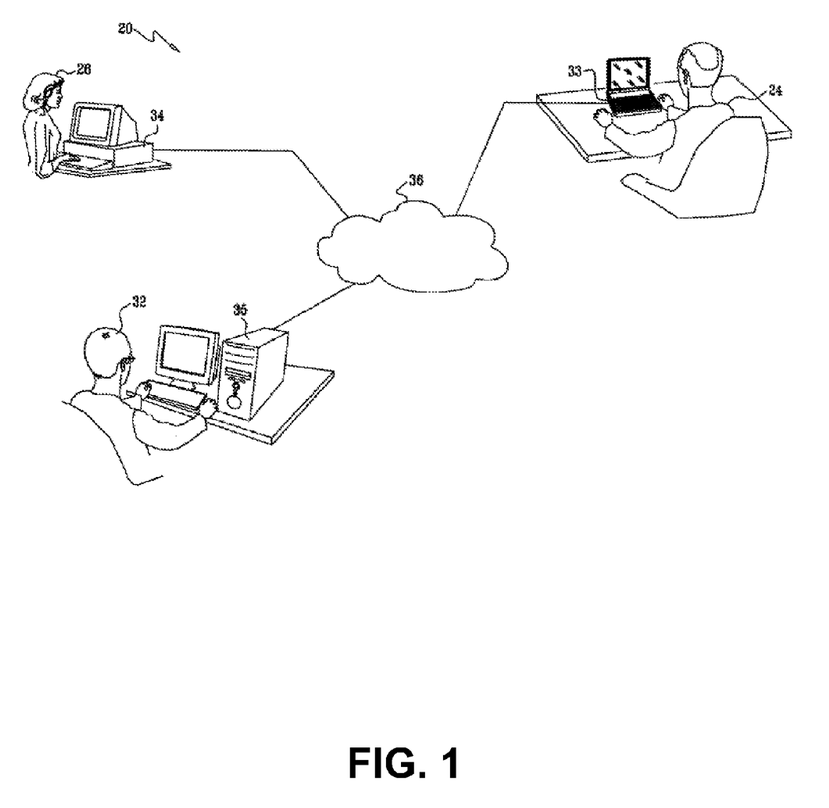
FIG. 1 shows an illustration of computerized environment, in accordance with some exemplary embodiments of the disclosed subject matter.

Referring now to FIG. 1 showing computerized environment in accordance with some exemplary embodiments of the subject matter. Computerized environment 20 comprises several developers (24, 28, 32). The developers may jointly develop a software product, such as an open source program. In some exemplary embodiments, the developers may be located remotely from one another and communicate using Computerized Network 36, such as the Internet. Each developer's computer (e.g., 33, 34, 35) may be connected to Computerized Network 36.

A modification made by Developer 32 may be reviewed, tested, or otherwise checked by at least one other developer, such as a manager, a review team, or the like.

In some exemplary embodiments, prior to transmitting his patches for review, Developer 32 may use an automated too to generate a split in accordance with the disclosed subject matter. Thereby, easing the review process. Additionally or alternatively, Reviewer 24 receiving one or more patches which are not coherent may utilize the automated tool to generate a different split for review.

Figure 2A:
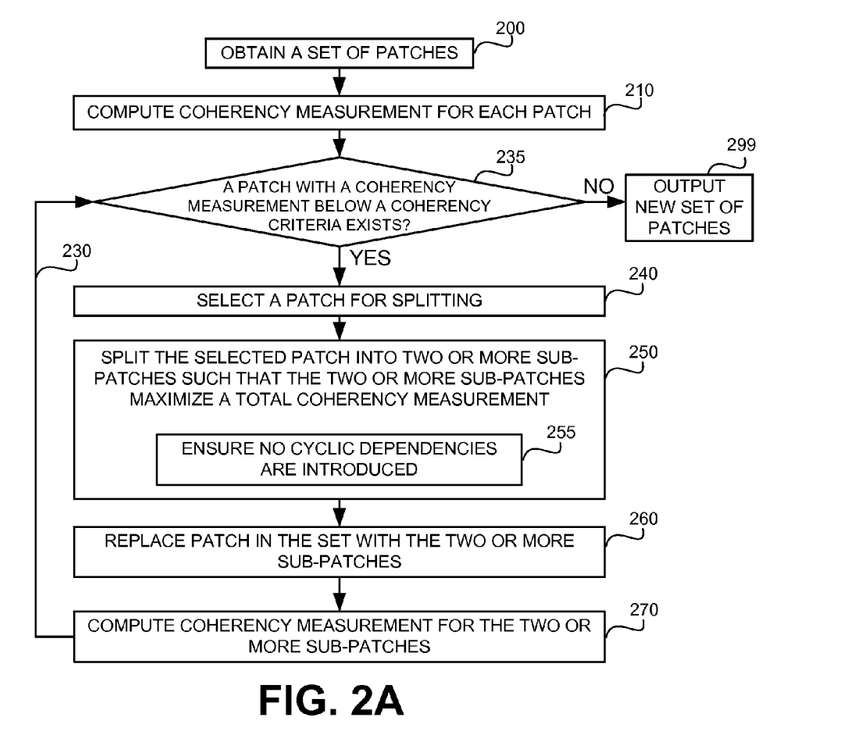
FIG. 2A-2C show flowchart diagrams of steps in a method for automatic manipulating patches, in accordance with some exemplary embodiments of the disclosed subject matter.

Referring now to FIG. 2A showing a flowchart diagram of a method for automatic manipulating patches, in accordance with some exemplary embodiments of the disclosed subject matter.

An initial split is obtained (Step 200) comprising one or more patches. For each patch, a coherency measurement is calculated (Step 210).

Loop 230 is performed iteratively until a predetermined coherency criteria threshold is met (Step 235). The coherency criteria threshold may be, for example, a minimal coherency measurement for each patch, an average coherency measurement for all patches, a combination thereof, or the like. In some exemplary embodiments, user's input may be used to decide whether or not to continue performing Loop 230. The user's input may be based on the user's appreciation of the coherency of the split or on different factors.

If the coherency criterion is met, the set of patches is outputted to a user (Step 299), such as by annotating the source code, by creating patch files, by transmitting patch files, by displaying the patches on a display, or the like. Otherwise, steps 240-270 of Loop 230 may be performed.

In Step 240, a patch is selected for splitting. In some exemplary embodiments, the patch with the lowest coherency measurement may be selected. Additionally or alternatively, the patch to be split may be manually selected by a user.

In Step 250, the selected patch may be split into two or more sub-patches. In some exemplary embodiments, each modification is determined to be added to an existing sub-patch or a new sub-patch based on a modification in a coherency measurement to the sub-patch, modification to the total coherency measurement of all sub-patches or the like. In some exemplary embodiments, all possible combination of splits into sub-patches may be generated, and, based on a computation of coherency measurements, one split into sub-patches may be selected. In some exemplary embodiments, the split into sub-patches increase average coherency measurement with respect to the patch. Additionally or alternatively, the split into sub-patches may be selected so as to increase, and optimally maximize, the total coherency measurement of the entire split, with respect to the split prior to splitting the patch into sub-patches.

In some exemplary embodiments, in addition to attempting to increase coherency measurements, Step 255 may be performed to ensure that no cyclic dependencies are introduced by the split. As an example, each potential sub-patch may be checked for cyclic dependencies. If a sub-patch is determined to introduce a cyclic dependency, it may not be part of the split.

In Step 260, the set of patches (such as the original set of Step 200, or a modified set that was modified during previous iterations of Loop 230) may be modified so as to include the new sub-patches instead of the selected patch, thereby a new split is determined in which the selected patch was split into sub-patches.

In step 270, coherency measurements may be measured for the sub-patches. Optionally, coherency measurements may have been measured during Step 250 and need not be computed again.

After step 270 is concluded, all patches of the new set determined in Step 260 have computed coherency measurements, and Step 235 may be performed once more in another iteration of Loop 230.

Figure 2B:
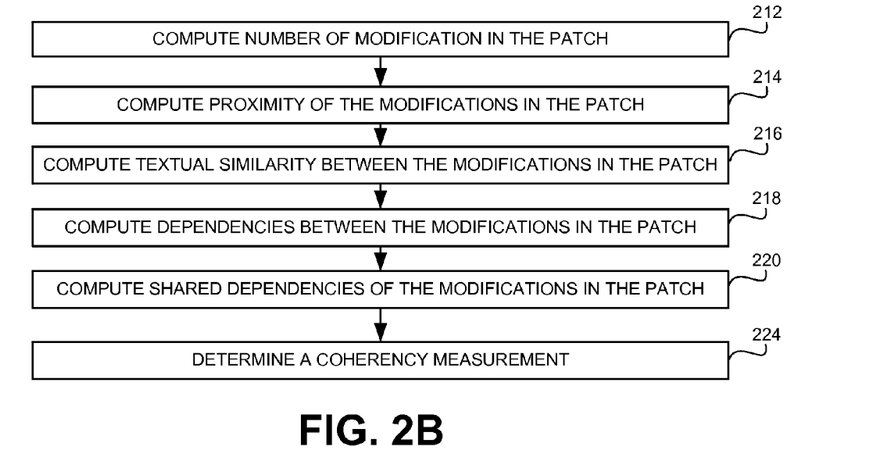

Referring now to FIG. 2B showing steps for computing coherency measurements of a patch, such disclosed in Step 210, in accordance with some exemplary embodiments of the disclosed subject matter.

In some exemplary embodiments, one or more of Steps 212, 214, 216, 218 and 220 may be performed to calculate factors useful in computing the coherency measurement.

In Step 212, a number of modifications in the patch may be determined. Additionally or alternatively, a number of lines of source code in the patch may be determined. In some exemplary embodiments, Step 212 computes a size of patch measurement. In some exemplary embodiments, the measurement may be normalized, for example, to a number between 0 and 1, such that an optimal size is 1 and a worst size of 0. In some exemplary embodiments, optimal size may be an intermediate size between the largest possible size and the smallest possible size, such as for example 100 source code lines.

In Step 214, proximity measurements of the modifications may be determined and computed. In some exemplary embodiments, proximity of all modifications may be used to compute a single proximity measurement of the patch, which, for example, may be normalized to a number between 0 and 1.

In Step 216, a textual similarity between the modifications may be determined and computed. In some exemplary embodiments, the measurement may be computed based on similarity of each modification. Additionally or alternatively, similarity may be computed based on similarity of each source code line, such that in case a single modification comprises several source code lines, each source code line is checked individually. In some exemplary embodiments, textual similarity measurements of all modifications may be used to compute a single textual similarity measurement of the patch, which, for example, may be normalized to a number between 0 and 1.

In Step 218, dependencies between the modifications in the patch may be computed. For example, for each modification a number of other modifications that depend thereon and/or number of other modifications that it depends on may be counted to compute the measurement. In some exemplary embodiments, all measured dependencies may be used to compute a single dependency measurement for the patch, which, for example, may be normalized to a number between 0 and 1.

In Step 220, shared dependencies between modifications in the patch may be computed. In some exemplary embodiments, for each modification, it may be determined how many other modifications depend on, or have depending thereon, a same patch, modification within a patch, use a same symbol (e.g., variable defined elsewhere, function defined elsewhere, or the like), have a same line of code depend on a symbol definition by the modification, or the like. In some exemplary embodiments, all measured shared dependencies may be used to compute a single measured shared dependency for the patch, which may, for example, be normalized to a number between 0 and 1.

In step 224, a coherency measurement may be computed based on the factors calculated in either of Steps 212-220. For example, a weighted average of the factors may be calculated so as to compute the coherency measurement. Thereby all factors are taken into account in the coherency measurement, while balancing a reduction in one factor by an increase in another factor.

Figure 2C:
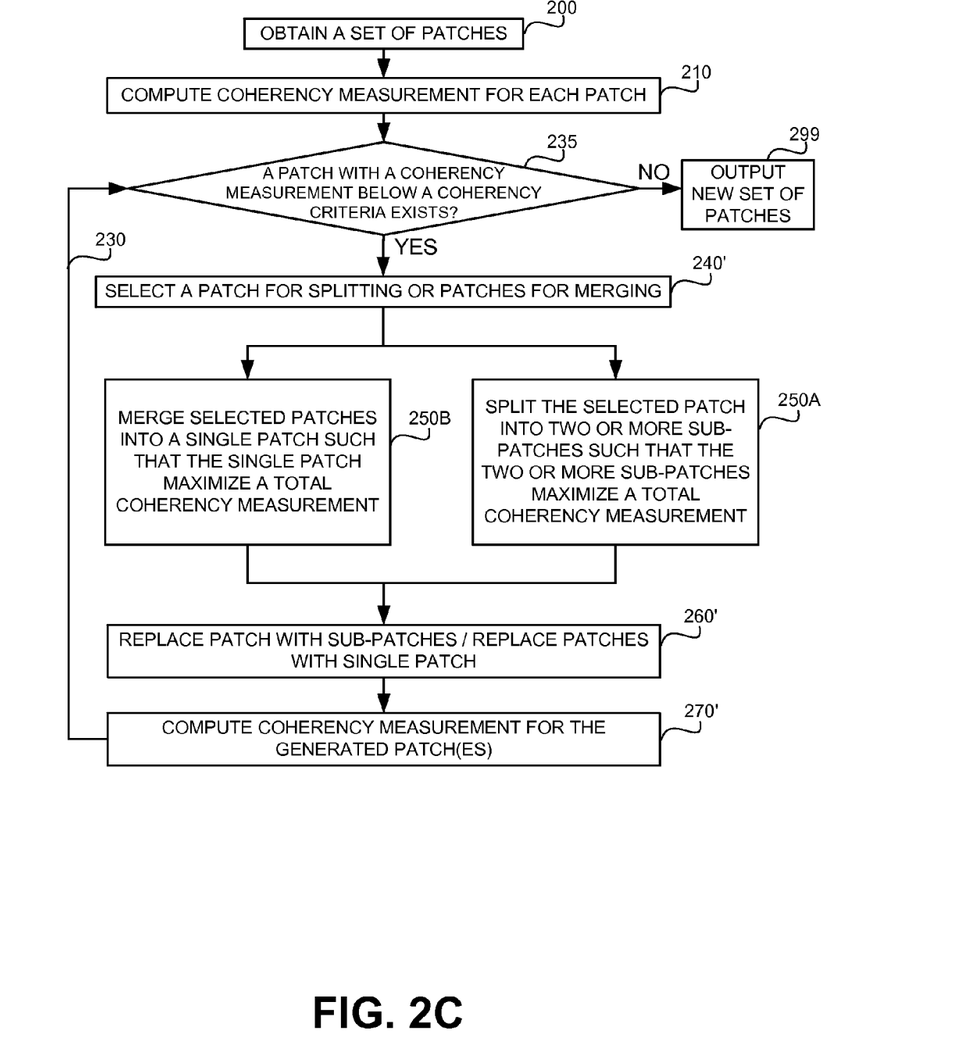

Referring now to FIG. 2C showing a flowchart diagram of a method for automatic manipulating patches, in accordance with some exemplary embodiments of the disclosed subject matter. The method of FIG. 2C is similar to that of FIG. 2A and comprises Steps 200, 210, 235, 299 and Loop 230 of FIG. 2A.

In step 240', similarly to Step 240 of FIG. 2A, a patch is selected for processing. However, Step 240' involves an additional selection: whether to split a single patch into sub-patches, or to merge two or more patches into an aggregated patch. In case merging is selected, a set of two or more patches to be merged are selected. The selection may be based on coherency measurements and based on a determination which operation would increase the coherency measurement more. In some cases, heuristics may be determined in lieu of actual computation of which operation provides the best outcome.

In one exemplary embodiment, patches to be merged may be patches having a smaller than optimal size and having a coherency measurement below a predetermined threshold. Based on the set of patches to be merged, one aggregated patch is selected which comprises at least two of the patches, but not necessarily all of them.

Based on the decision in Step 240', either Step 250A or Step 250B is performed.

In Step 250A the selected patches are merged into an aggregated patch. The aggregated patch may be the patch which increases the average coherency measurement by most with respect to the original average coherency measurement of the set of patches to be merged. In some exemplary embodiments, several options of merging portions of the set are considered, and based on coherency measurements thereof one option is selected to be performed. In some exemplary embodiments, during the merging process, dependencies are checked so as to avoid creating cyclic dependencies.

In Step 250B, which is similar to Step 250 of FIG. 2A, a selected patch is split.

In Step 260', which is similar to Step 260 of FIG. 2A, the set of patches is modified based on the splitting or merging performed by Step 250A or Step 250B.

In Step 270', which is similar to Step 270 of FIG. 2A, and in case it was not previously computed, coherency measurements of the newly generated patches (either sub-patches or aggregated patches) may be computed.

It will be noted that in some embodiments of the disclosed subject matter, an initial patch may be provided and split into unit patches, which may be merged to create the new split. "Unit patches" are patches comprising a substantially smallest block a patch and are not fragmented into smaller blocks. For example, a unit block may be a block comprising one statement, one source code line, or the like. As another example, the size of the unit patches may be predetermined, such as by a user, to any arbitrary number, such as two source code lines, three code statements, or the like. In one embodiment, Step 200 of FIG. 2C comprises obtaining an initial patch and splitting the patch into unit patches, thereby obtaining a set of patches which are to be merged into the new split.

Figure 3:
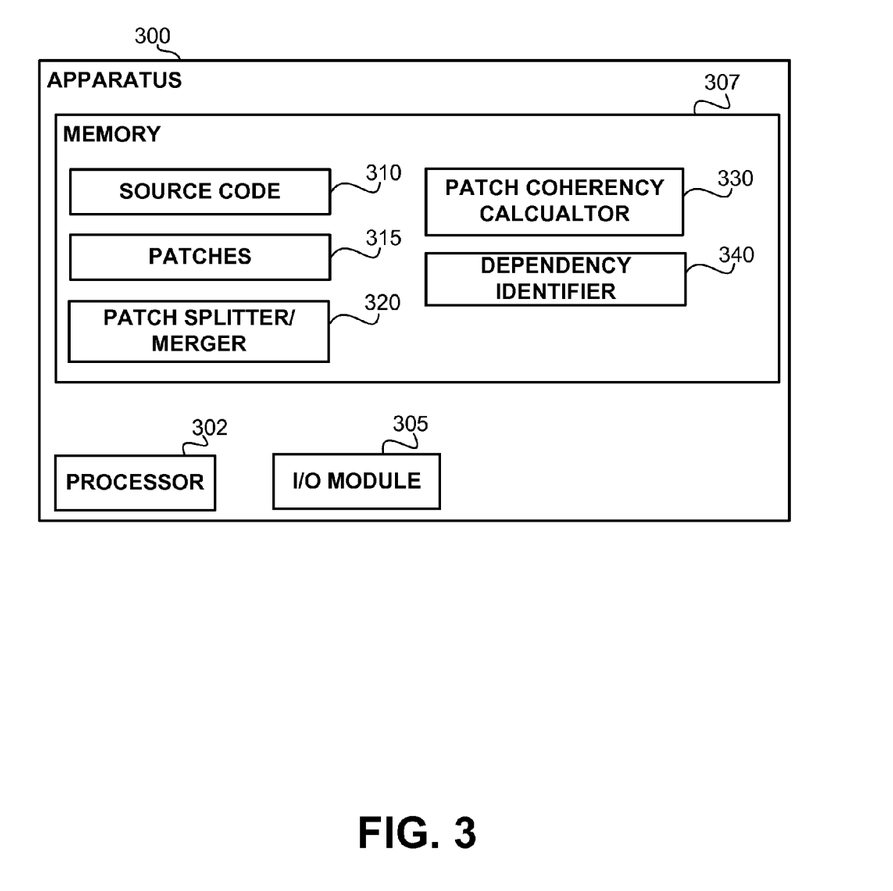
FIG. 3 shows a block diagram of components of a computerized apparatus for automatic manipulation of patches, in accordance with some exemplary embodiments of the disclosed subject matter.

Referring now to FIG. 3 showing a block diagram of components of a computerized apparatus, in accordance with some exemplary embodiments of the disclosed subject matter.

In some exemplary embodiments, Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments, Apparatus 300 may comprise an Input/Output (I/O) Module 305 such as a receiver, transmitter, transceiver, modem, an input device, an output device or the like. In some exemplary embodiments, I/O Module 305 is utilized to connect to an I/O device for providing input by or output to a human user. I/O Module 305 may be operatively connected to a display, to a pointing device, a keyboard, or the like. It will however be appreciated that the system can operate without human operation.

In some exemplary embodiments, Apparatus 300 may comprise a Memory 307. Memory 307 may be computerized memory, such as persistent or volatile, or a combination thereof. For example, Memory 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory 307 comprises several memory devices, such as for example a RAM and a hard disk. In some exemplary embodiments, Memory 307 may retain program code operative to cause Processor 302 to perform acts associated with any of the steps shown in FIG. 2A-2C or the like.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

In some exemplary embodiments, Memory 307 may retain Source Code 310 as well as Patches 315. In some exemplary embodiments, based on the operation of Apparatus 300, Patches 315 may be modified from an original split. In some exemplary embodiments, the patches may initially be represented as annotations in Source Code 310 and later on Patches 315 may be generated based on the annotations, such as by Patch Generator (not shown).

Patch Splitter/Merger 320 may be configured to split one patch into two or more sub-patches and/or merge two or more patches into an augmented patch. In some exemplary embodiments, Patch Splitter/Merger 320 is configured to perform steps of the methods of FIG. 2A-2C for splitting and/or merging patches and thereby modifying a split. In some exemplary embodiments, Patch Splitter/Merger 320 may be operatively coupled to a Patch Coherency Calculator 330 in order to determine which patches to merge and/or which patch to split, and/or how to perform the splitting/merging.

In some exemplary embodiments, Patch Coherency Calculator 330 may be configured to calculate a coherency measurement for a patch. In some exemplary embodiments, Patch Coherency Calculator 330 may be configured to perform steps of FIG. 2B.

In some exemplary embodiments, Dependency Identifier 340 may be configured to determine dependencies between modifications and/or shared dependencies. In some exemplary embodiments, Dependency Identifier 340 may be utilized by Patch Coherency Calculator 330 to compute factors useful in coherency measurement calculation. In some exemplary embodiments, Dependency Identifier 340 may be used by Patch Splitter/Merger 320 to avoid introducing cyclic dependencies into the split.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computerized apparatus having a processor, said processor is configured to:
    obtain a source code patch comprising plurality of source code modification instructions with respect to a source code of a computer program, wherein the source code is code developed by a developer, and the source code patch can be manually reviewed; and
    automatically split the source code patch into plurality of sub-patches, wherein each sub-patch is also a patch and comprises less instructions than the source code patch, and wherein applying the plurality of sub-patches on the source code in an order is equivalent to applying the source code patch, comprising:
        selecting a patch to split out of a set of patches based on a measured score of the patches;
        splitting the selected patch into at least two sub-patches; and
        repeating the selecting and the splitting with respect to a new set, said new set comprising:
            the set of patches and excluding the selected patch; and
            the at least two sub-patches,
        wherein each sub-patch of the plurality of sub-patches can be manually reviewed independently.

2. The computerized apparatus of claim 1, wherein the automatic splitting comprises:
    selecting a subset of the source code modification instructions of the source code patch based on a coherency criterion; and
    generating a sub-patch based on the subset of the source code modification instructions.

3. The computerized apparatus of claim 1, wherein said processor is further configured to: determine the order based on dependencies between source code modification instructions of the sub-patches so as a first sub-patch is ordered before a second sub-patch based on the second sub-patch having a second source code modification instruction that depends on a first source code modification instruction of the first sub-patch.

4. The computerized apparatus of claim 2, wherein said processor is further configured to:
    compute a coherency measurement of the subset of the source code modification instructions; and
    compare the coherency measurement with the coherency criterion.

5. The computerized apparatus of claim 4, wherein computing the coherency measurement comprises counting a number of source code lines in the subset.

6. The computerized apparatus of claim 4, wherein computing the coherency measurement comprises determining proximity of the source code modification instructions to each other.

7. The computerized apparatus of claim 4, wherein computing the coherency measurement comprises computing textual similarity between the source code modification instructions.

8. The computerized apparatus of claim 4, wherein computing the coherency measurement comprises determining dependencies between the source code modification instructions.

9. The computerized apparatus of claim 4, wherein computing the coherency measurement comprises determining shared dependencies of the source code modification instructions.

10. The computerized apparatus of claim 4, wherein the coherency criterion prohibits creating a circular dependency between a first and second patches, wherein the first and second patches have circular dependency if the first patch depends, directly or indirectly, on the second patch and the second patch depends, directly or indirectly, on the first patch.

11. The computerized apparatus of claim 1, whereby for each sub-patch of the plurality, applying the sub-patch after applying all required sub-patches with respect to the sub-patch is configured to provide a source code version that does not introduce a compilation error that would not exist if the source code patch would have been applied, wherein required sub-patches are sub-patches that the sub-patch depends on.

12. The computerized apparatus of claim 1, wherein source code modification instructions are selected from the group consisting of: a new source code line to be added, an existing source code line to be deleted, and a modified source code line to replace an existing source code line.

13. The computerized apparatus of claim 1, wherein the automatic splitting is performed by splitting the source code patch into a set of unit patches and merging the set of unit patches into subsets thereby determining the plurality of sub-patches.

14. A computer-implemented method performed by a processor, the method comprising:
    obtaining a source code patch comprising plurality of source code modification instructions with respect to a source code of a computer program, wherein the source code is code developed by a developer, and the source code patch can be manually reviewed;
    automatically splitting the source code patch into plurality of sub-patches, wherein each sub-patch is also a patch and comprises less instructions than the source code patch, and wherein the plurality of sub-patches, if applied on the source code in an order, provide an output that is equivalent to applying the source code patch, comprising:
- selecting a patch to split out of a set of patches based on a measured score of the patches;
- splitting the selected patch into at least two sub-patches; and
- repeating the selecting and the splitting with respect to a new set, said new set comprising:
  - the set of patches and excluding the selected patch; and
- the at least two sub-patches,
- wherein each sub-patch of the plurality of sub-patches can be manually reviewed independently.

15. The computer-implemented method of claim 14, wherein said automatically splitting comprises:
- selecting a subset of the source code modification instructions of the source code patch based on a coherency criterion; and
- generating a sub-patch based on the subset of the source code modification instructions.

16. The computer-implemented method of claim 15 further comprising:
- determining the order based on dependencies between source code modification instructions of the sub-patches so as a first sub-patch is ordered before a second sub-patch based on the second sub-patch having a second source code modification instruction that depends on a first source code modification instruction of the first sub-patch.

17. The computer-implemented method of claim 15 further comprising:
- computing a coherency measurement of the subset of the source code modification instructions; and
- comparing the coherency measurement with the coherency criterion.

18. The computer-implemented method of claim 17, wherein computing the coherency measurement comprises at least one step of the group consisting of:
- counting a number of source code lines in the subset;
- computing the coherency measurement comprises determining proximity of the source code modification instructions to each other;
- computing the coherency measurement comprises computing textual similarity between the source code modification instructions;
- computing the coherency measurement comprises determining dependencies between the source code modification instructions; and
- computing the coherency measurement comprises determining shared dependencies of the source code modification instructions.

19. A computer program product comprising:
- a non-transitory computer readable medium retaining thereon instructions that, when executed by a processor, are configured to cause the processor to perform the steps of:
- obtaining a source code patch comprising plurality of source code modification instructions with respect to a source code of a computer program, wherein the source code is code developed by a developer, and the source code patch can be manually reviewed; and
- automatically splitting the source code patch into plurality of sub-patches, wherein each sub-patch is also a patch and comprises less instructions than the source code patch, and wherein the plurality of sub-patches, if applied on the source code in an order, provide an output that is equivalent to applying the source code patch, comprising:
  - selecting a patch to split out of a set of patches based on a measured score of the patches;
  - splitting the selected patch into at least two sub-patches; and
  - repeating the selecting and the splitting with respect to a new set, said new set comprising:
    - the set of patches and excluding the selected patch; and
- the at least two sub-patches, wherein each sub-patch of the plurality of sub-patches can be manually reviewed independently.

* * * * *